United States Patent
Haribhaskaran et al.

(10) Patent No.: US 11,004,108 B2
(45) Date of Patent: May 11, 2021

(54) MACHINE-LEARNING TECHNIQUES TO PREDICT OFFSITE USER INTERACTIONS BASED ON ONSITE MACHINE-LEARNED MODELS

(71) Applicant: Microsoft Technology Licensing, LLC, Redmond, WA (US)

(72) Inventors: Alagu Sanjana Haribhaskaran, Redmond, WA (US); Shahriar Shariat Talkhoonche, Redmond, WA (US); Zhen Wang, Sunnyvale, CA (US); Yanbo Ma, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 120 days.

(21) Appl. No.: 16/457,511

(22) Filed: Jun. 28, 2019

(65) Prior Publication Data
US 2020/0410528 A1 Dec. 31, 2020

(51) Int. Cl.
G06Q 30/02 (2012.01)
G06N 20/20 (2019.01)

(52) U.S. Cl.
CPC ......... *G06Q 30/0243* (2013.01); *G06N 20/20* (2019.01); *G06Q 30/0246* (2013.01)

(58) Field of Classification Search
CPC combination set(s) only.
See application file for complete search history.

(56) References Cited

U.S. PATENT DOCUMENTS

2012/0310745 A1* 12/2012 Bhatia ............... G06Q 30/02
705/14.66
2018/0150874 A1* 5/2018 Chen ............... G06Q 30/0254
(Continued)

FOREIGN PATENT DOCUMENTS

CN 109615060 A * 4/2019

OTHER PUBLICATIONS

Wang et al, A New Approach for Advertising CTR Prediction Based on Deep Neural Network via Attention Mechanism, Sep. 13, 2018, Computational and Mathematical Methods in Medicine, 8056541, p. 1-12. (Year: 2018).*

(Continued)

*Primary Examiner* — Marie P Brady
(74) *Attorney, Agent, or Firm* — Hickman Becker Bingham Ledesma LLP (57) ABSTRACT

Techniques for predicting an offsite entity interaction rate are provided. One approach involves using a first machine-learned model that includes a first plurality of features that correspond to entity and campaign attributes. The approach also involves training a second machine-learned model that includes a second plurality of features that includes a particular feature corresponding to predicted entity interaction rates. Thus, output of the first machine-learned model is input to the second machine-learned model. The second machine-learned model includes multiple weights that include a particular weight for the particular feature. A content request is received and a set of campaigns is identified based on an entity identifier associated with the content request. Scores are generated based on the first and second machine-learned models. Based on the scores, a campaign is selected and campaign data associated with the campaign is transmitted over a computer network.

20 Claims, 5 Drawing Sheets

(56) References Cited

U.S. PATENT DOCUMENTS

2019/0073590 A1* 3/2019 Wu ........................ G06T 1/20
2019/0172089 A1* 6/2019 Tang ................ G06Q 30/0242
2019/0251593 A1* 8/2019 Allouche ........... G06Q 30/0269
2020/0034874 A1* 1/2020 Narayan ............ G06Q 30/0244

OTHER PUBLICATIONS

Qu et al, Product-based Neural Networks for User Response Prediction, 2016 IEEE 16th International Conference on Data Mining, p. 1149-1154. (Year: 2016).*

* cited by examiner

MACHINE-LEARNING TECHNIQUES TO PREDICT OFFSITE USER INTERACTIONS BASED ON ONSITE MACHINE-LEARNED MODELS

TECHNICAL FIELD

The present disclosure relates to optimizing offsite electronic content delivery and, more particularly, to predicting offsite user interaction rates based on machine-learned onsite models.

BACKGROUND

A content delivery system publishes electronic content to users of the content delivery system. The electronic content may also be published as sponsored content through many third-party web applications and third-party mobile applications to users of the content delivery system. In some cases, users that are active onsite (the content delivery system) can be widely different from offsite users (such as users of third-party web applications or third-party mobile applications).

It can become a resource-intensive task to collect all the user data associated with active offsite users when a content request is received at the content delivery system from an offsite third-party system. Specifically, it may create delay in collecting the user data, selecting target content based on the user data, and serving the target content during runtime. Therefore, a comprehensive and efficient method of aggregating and utilizing the onsite data to predict offsite user interaction rates before serving the content is desired to better serve the content that meets the criteria.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for using machine learning algorithms to predict offsite entity interactions are provided. One approach to predicting the offsite entity interactions is to use a first machine-learned model that includes a first set of features. The first set of features includes attributes of an entity and attributes of a campaign. In one embodiment, multiple predicted entity interaction rates are generated using the first machine-learned model where each entity interaction rate corresponds to an entity-campaign pair.

The approach includes a computerized method for training a second machine-learned model. The second machine-learned model includes a second set of features which includes a particular feature that corresponds to predicted entity interaction rates. The second machine-learned model also includes multiple weights that include a particular weight corresponding to the particular feature.

The method includes receiving a content request from a third-party online exchange system over a computer network and identifying an entity identifier associated with the content request. The method further includes identifying one or more campaigns that are associated with the entity identifier based on the entity identifier. For each campaign in the set of campaigns, multiple feature values are identified. The feature values correspond to the second plurality of features that include a particular predicted entity interaction rate for a pair including the campaign and the entity identified by the entity identifier.

A score is generated based on the multiple feature values using the second machine-learned model and the score is added to a set of scores. A particular campaign is selected from among the set of campaigns based on the set of scores. In response to selecting the particular campaign, campaign data that is associated with the particular campaign is caused to be transmitted to the third-party exchange.

Embodiments described herein improve the utility of electronic content delivery methods by predicting offsite entity interaction rates for one or more campaigns that are presented to the users through the third-party publisher systems. Embodiments improve user experience by selecting a campaign with which the user is more inclined to interact and delivering the campaign without incurring the latency. Embodiments described herein minimizes scatterness of data that can result in underfitting or overfitting of a machine learned model by using unbiased training data. Embodiments further improve the user interaction with one or more content items rendered on a computing device by providing related and relevant content that extends the utility of the machine-learned onsite model to the offsite content interaction prediction.

System Overview

Figure 1:
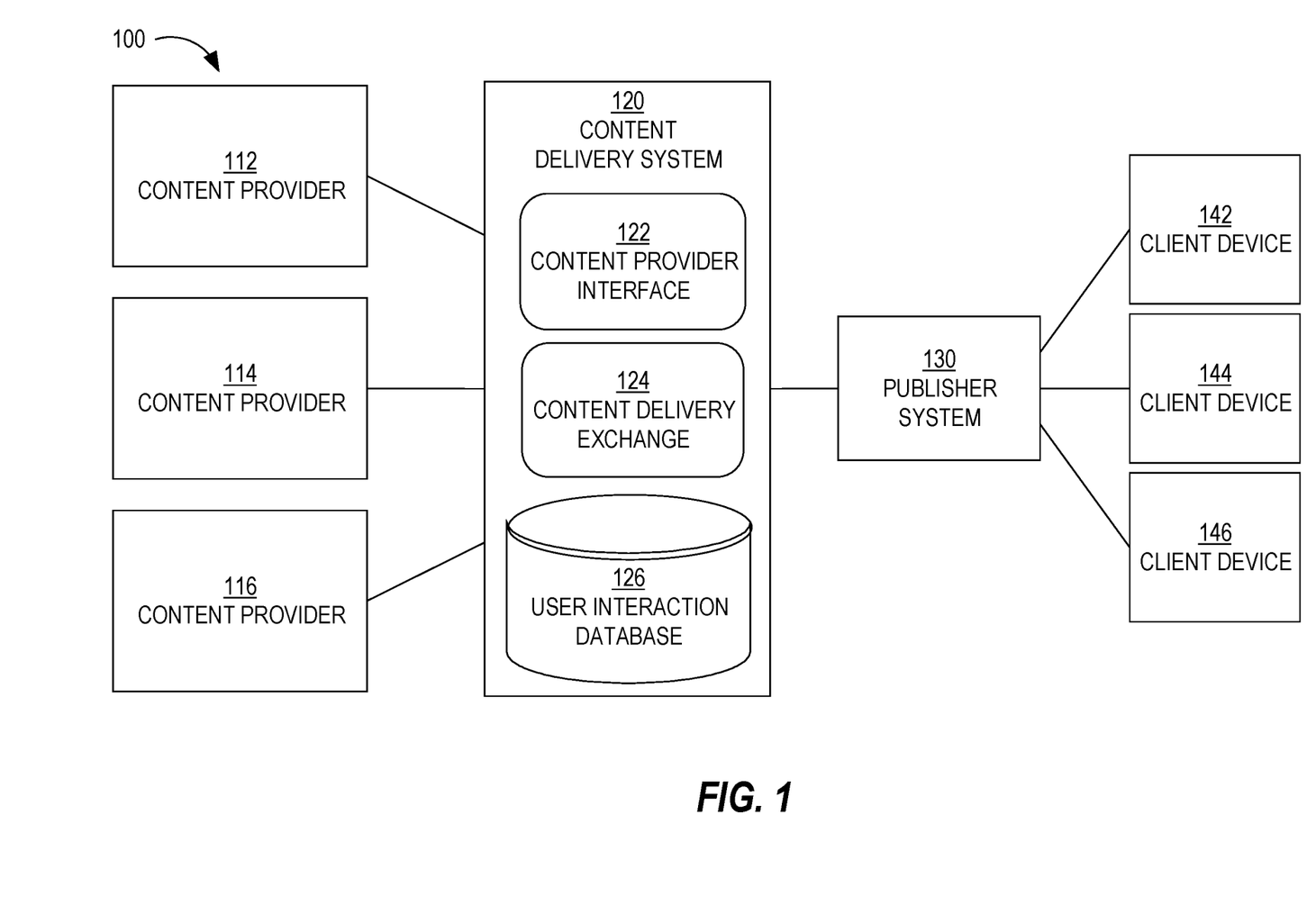
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders, includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may comprise combinations of multiple images, such as a carousel ad. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ or LinkedIn Audience Network™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, install a particular application, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users on one or more publishers. In an embodiment, a content delivery campaign defines who receives a content item and where in the sense that a content item is prevented from being displayed through one publisher application but is allowed to be displayed through another publisher application. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Some member characteristics may be generated using one or more machine learning techniques, in both features (e.g., "standardized" job titles) and in probabilistic (or confidence-based) member mapping from device ID (e.g., LiveRamp). Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per mille (thousand) impressions or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device), and publisher-specific filtering where a publisher can specify that it does not want content pertaining to certain categories displayed in its application and such a filter is honored by filtering those campaigns for that request. In a related embodiment, instead of relying sole on member attributes to identify users to target, activities in common with other user may be taken into account. For example, if user A clicked on the same (or similar) content item as user B who was targeted by campaign C, then user A may be targeted to campaign C, even though user A might not satisfy the targeting criteria of campaign C. Such an "expansion" of targeted users may be managed with a confidence score.

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction." In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content items, across client devices 142-146 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item, content delivery system 120 may calculate a CTR for the content item.

Another type of event that content delivery system 120 may log is a win event, which is fired when a third-party exchange notifies content delivery system 120 in response to a content item selected by content delivery system 120 having won a content item selection event conducted by the third-party exchange. A win event does not necessarily guarantee that the content item will be presented by a third-party publisher since the third-party publisher might never present the content item.

Serving Pipeline

Figure 2:
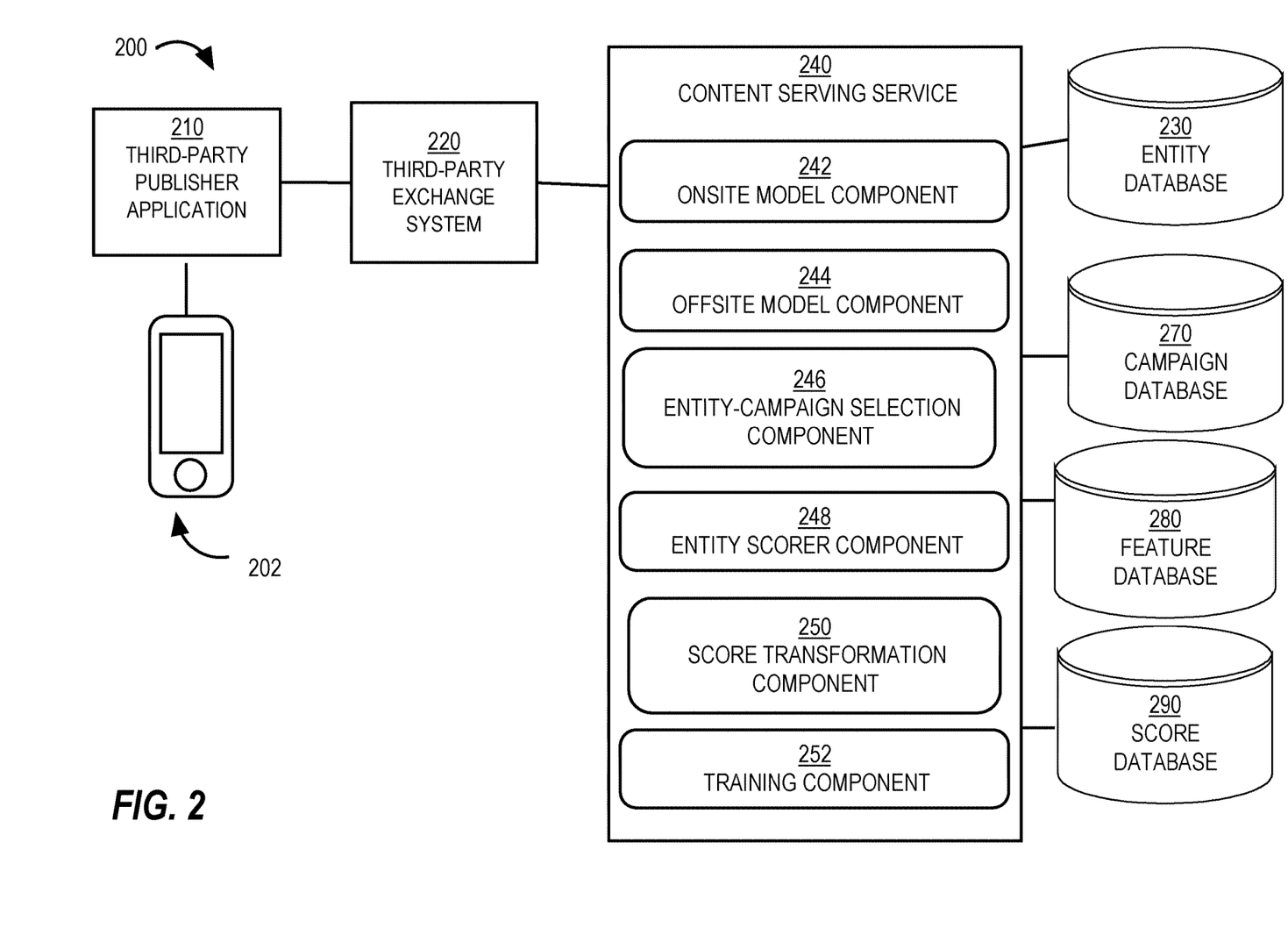
FIG. 2 is a block diagram that depicts an example serving pipeline for predicting an offsite user interaction rate using a machine-learned model, in an embodiment.

FIG. 2 is a block diagram that depicts an example serving pipeline 200 for predicting an offsite user interaction rate using a machine-learned model, in an embodiment. Content requests initiated by a client device 202 may come from a third-party publisher application 210.

Serving pipeline 200 includes a content serving service 240, an entity database 230, a campaign database 270, a feature database 280, and a score database 290. Although only one third-party exchange system 220 and one third-party publisher application 210 are depicted, multiple third-party publisher applications maybe communicatively coupled to third-party exchange system 220 and multiple third-party exchange systems may be communicatively coupled (e.g., over a computer network, such as the Internet) to content serving service 240. Content delivery system 120 may include content serving service 240, entity database 230, campaign database 270, feature database 280, and score database 290.

Content serving service 240 receives, from third-party exchange system 220, content requests initiated by third-party publisher application 210 executing on a client device 202. A user operating client device 202 interacts with third-party publisher application 210 (e.g., provided by CNN) to initiate a content request. A user may be a registered entity (e.g., member) of an online service, such as a social network service. Third-party publisher application 210 sends the content request to third-party exchange system 220. In response, third-party exchange 220 transmits the content request to content serving service 240. The content request from third-party exchange 220 may include a publisher identifier that uniquely identifies a third-party publisher application, a member ID that uniquely identifies a user or a user account, a mobile identifier (MAID) that uniquely identifies the computing device operated by the user, a device ID (e.g., a MAC address) that uniquely identifies the computing device on which the third-party publisher application is executing, an IP address, and/or a GPS location. In response to the content request, third-party exchange system 220 receives content data and displays content associated with the content data on third-party publisher application 210 executing on client device 202.

Content Serving Service

Content serving service 240 includes an onsite model component 242, an offsite model component 244, a entity-campaign selection component 246, an entity-scorer component 248, a score transformation component 250, and a training component 252. Processes implemented by components in content serving service 240 may be performed offline.

Content serving service 240 receives the content request and determines content (e.g., a campaign) based on a score generated using one or more onsite and offsite machine-learned models. A score is a representation of a user's inclination to interact with the displayed campaign on through third-party publisher application 210. In other words, a score represents how likely a user will click on a particular campaign that is served offsite adjacent to content that is provided by third-party publisher application 210. In some embodiments, a score is a predicted entity interaction rate or click-through rate (pCTR) and can be computed using one or more onsite and offsite features.

Onsite Model Component

Based on the onsite features, the onsite machine-learned model predicts a user's interaction rate (e.g., a pCTR) with a particular campaign if a content item of the particular campaign is presented to a user offsite (i.e., adjacent to content provided by third-party publisher application 210). Onsite model component 242 accesses an onsite machine-learned model that generates a predicted entity interaction rate. An entity (or user) may be associated with one or more content delivery campaigns. For each entity-campaign pair, a predicted entity interaction rate is generated.

The onsite model is trained based on the onsite data using one or more machine-learning techniques. The machine-learned onsite model encapsulates one or more onsite features. In some embodiments, the onsite model is generated offline and is used for both online use and offsite use. The onsite model is computed before a content request is received at content serving service 240, avoiding data computation during runtime. Onsite model component 242 identifies onsite features and computes onsite feature values for the onsite model.

In one embodiment, example onsite features include an entity-campaign affinity score. An entity-campaign affinity score is a representation of a user's general inclination to interact with a particular campaign based on attributes of entities and attributes of content delivery campaigns. In some embodiments, users with similar attributes are predicted to have similar interactions with a particular campaign.

The entity-campaign affinity score predicts how likely an entity/user will click on a content item of a particular campaign based on attributes of entities and attributes of campaigns. To calculate an entity-campaign affinity score, values of attributes of an entity and values of attributes of a campaign are determined. Non-limiting example attributes of entities include a job title, industry, skill, geolocation, companies, seniority, job function, degree, the field of study, and years of experience. Non-limiting example attributes of campaigns include a type of campaign, a purpose of the campaign, text description of the campaign, visual elements of an image of the campaign, one or more attributes of a content provider of the campaign, entity-campaign interactions, and/or targeting criteria of the campaign. The attribute values of entities are stored in entity database 230 and attribute values of campaigns are stored in campaign database 270.

In a related embodiment, example onsite features include an onsite observed CTR (oCTR). Content serving service 240 tracks the number of times the set of campaigns is presented ("impressions"), the number of user selections of the campaigns (e.g., click-throughs), or the number of conversions that resulted from the content delivery campaign. Impression counts, selection counts, and conversion counts can be generated on a per-entity basis, on a per-content delivery campaign basis, and/or on a per-entity-campaign pair basis. A user selection rate (number of selections/number of impressions) is tracked and stored as an observed CTR. Content serving service 240 may predict that a user's inclination to interact with a particular campaign when the particular campaign is presented offsite generally correlates with a user's inclination to interact with the particular campaign when the particular campaign is served onsite. For each entity-campaign pair, oCTR value is stored in entity database 230 if historical data can be collected and is available (i.e., there is overlap between members of offsite and member of onsite).

Offsite Model Component

Offsite model component 244 accesses an offsite machine-learned model that predicts an offsite entity interaction rate. The offsite model is trained based on output from the onsite model such as pCTR values using one more machine-learning techniques. In some embodiments, the offsite model that is trained based on the onsite model is a much more accurate statistical summarization of an offsite predicted entity interaction rate because the offsite model takes the output of the onsite model as input, thereby allowing a richer training data set to be used to train a more granular model. In some embodiments, the offline model is computed before a content request is received at content item serving service 240, minimizing the selection time and rendering time of content.

In some embodiments, the offsite historical data is used to generate feature values for the offsite model to generate an accurate prediction. Offsite model component 244 identifies offsite features and computes offsite feature values. The offsite features can be any offsite features that take place outside of content serving service 240. Non-limiting example offsite features include observed/actual entity selection rate (oESR) of a campaign, oESR of a third-party publisher system, oESR of a campaign on a third-party publisher system, oESR of a third-party exchange system, oESR of a campaign format, oESR of an entity, oESR of an Operating System (OS) of a computing device that initiated the content request, and/or a number of selections of each of these features. The offsite features and feature values are stored in feature database 280. Thus, different third-party exchange systems have different oESRs, different publisher systems have different oESRs, different content delivery campaigns have different oESRs, different publisher system-campaign combinations have different oESRs, different OSs (e.g., Android, iOS) have different oESRs, different format types (e.g., banner, interstitial) have different oESRs, different entities have different oESRs, and different entity segments (to which multiple entities may belong) have different oESRs. Such oESRs may be calculated over all time (e.g., any impression and selection before the present) or over a certain time range (e.g., the last seven days' worth of online activity data).

Entity-Campaign Selection Component

Entity-campaign selection component 246 selects entity-campaign pairs and generates scores for the pairs. Entity-campaign selection component 246 identifies entities who are active offsite (content requests are initiated by the active entities through third-party publisher applications). When the entities are determined to be active, the active entity-campaign pairs can be identified. The active entity-campaign pairs are identified by identifying entity IDs that are associated with entities who are presented with particular campaigns offsite (impression events) within a certain period of time (e.g., fourteen days) and matching the entity IDs with an array of the particular campaign IDs that are associated with campaigns.

Entity Scorer Component

For each entity-campaign pair, an entity-campaign affinity score can be generated using an onsite model (pCTR model). Entity scorer component 248 leverages the onsite data and the onsite model to compute an entity-campaign affinity score. In some embodiments, entity scorer component 248 generates fake request data for every entity-campaign pair and incorporates the request data with a rich member and campaign feature set (onsite data). After applying the required transformations to the data, entity scorer component 248 computes an entity-campaign affinity score (e.g., raw pCTR value) using the onsite model.

Score Transformation Component

Score transformation component 250 calculates a predicted entity-campaign affinity score for each entity-campaign pair. In some embodiments, scores are calculated for a certain number of campaigns for each entity (e.g., twenty). Member's associated campaigns and corresponding scores can be stored as tuples of numerical values. For example, member A's identifier can be stored as a key and associated campaigns and the corresponding values can be stored as memberID→(campaign_1: score value for campaign_1, campaign_2: score value for campaign_2). The tuple values are stored in score database 290.

In some embodiments, scores are computed using one or more discretization techniques. Often, member affinity scores are raw and continuous pCTR values carry noise. To mitigate the noise, the score value can be discretized. To discretize the continuous score values, several quantiles can be created. The quantiles can divide numerical data into groups. For example, ten groups of quantiles can be created and any numerical value that falls within a particular quantile range can be assigned to a single value.

For example, if a particular value (e.g., 1.14) falls within the first group (e.g., one to two), then the particular value is assigned to a single pre-defined score (e.g., 1). The raw pCTR score (1.14) is replaced with the pre-defined score (1). In some embodiments, one or more histogram techniques are used to compute the score. The size of each bin for each histogram is calculated based on the numerical feature values. The histogram techniques can also be used to reduce the noise and compress the data.

In one embodiment, if a particular entity-campaign affinity score is not stored in score database 290, then a pre-defined default value can be assigned to the particular entity-campaign pair. In one instance, a maximum quantile value of the campaign can be used as the pre-defined default value to calculate a score for the missing entity-campaign pair. For the missing entity-campaign pair, a score of (−1, score) can be used as a value and campaign ID can be used as a key, such as, campaign ID→(−1, score).

In a related embodiment, when a particular campaign is associated with several members and each member falls into a very narrow range of scores, the scores can be discretized. In doing so, the particular campaign is removed since related features are likely to be uninformative and likely to resort to a default score. Score transformation component 250 is configured to add Gaussian random noise to distribute the scores and apply the discretization techniques. In another embodiment, when a particular campaign is associated with a clustered set of scores for the members, the scores can be discretized. In doing so, score transformation component 250 adds low variance noise to induce the spread of the scores.

Training Component

One or more machine learning techniques determine which of the onsite or offsite features are more important for determining a predicted entity selection rate. Generally, more important features have higher weights than less important features. For example, an observed offsite CTR feature for a campaign may be assigned a higher weight than an observed CTR feature for a third-party publisher application if it is determined that the offsite campaign feature is a more determinative factor than the offsite third-party publisher feature when predicting the offsite CTR score. The machine learning techniques are used to determine a coefficient (weight) for each feature that is incorporated into the offsite model and changes the coefficient when the offsite model is updated using a training data set.

Training component 252 uses one or more machine learning techniques to train an offsite prediction model using affinity scores generated by the onsite model using the onsite features and historical offsite data. Non-limiting examples of machine learning techniques to train a prediction model include Linear Regression (LR), Support Vector Machines (SVMs), Random Forest (RF), and Artificial Neural Networks (ANNs).

Process Overview

Figure 3A:
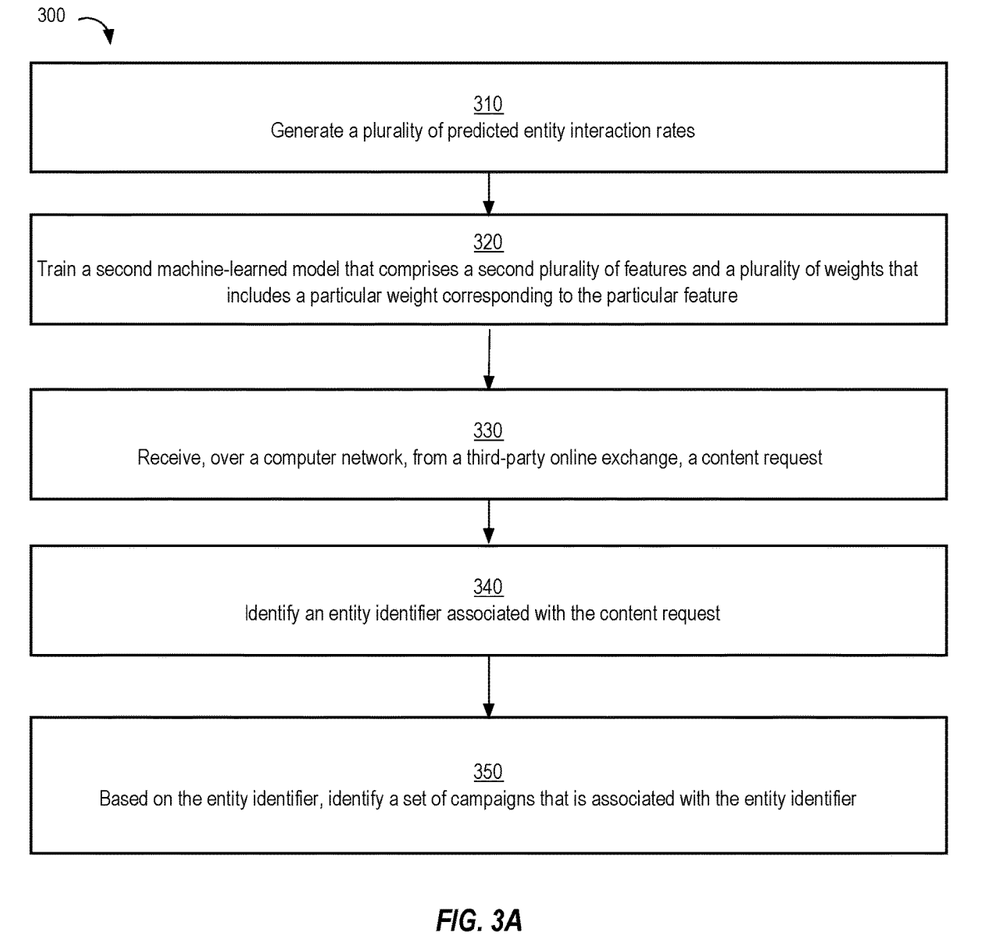
FIGS. 3A and 3B are flow diagrams that depict a process for predicting an offsite user interaction rate using a machine-learned model, in an embodiment.
Figure 3B:
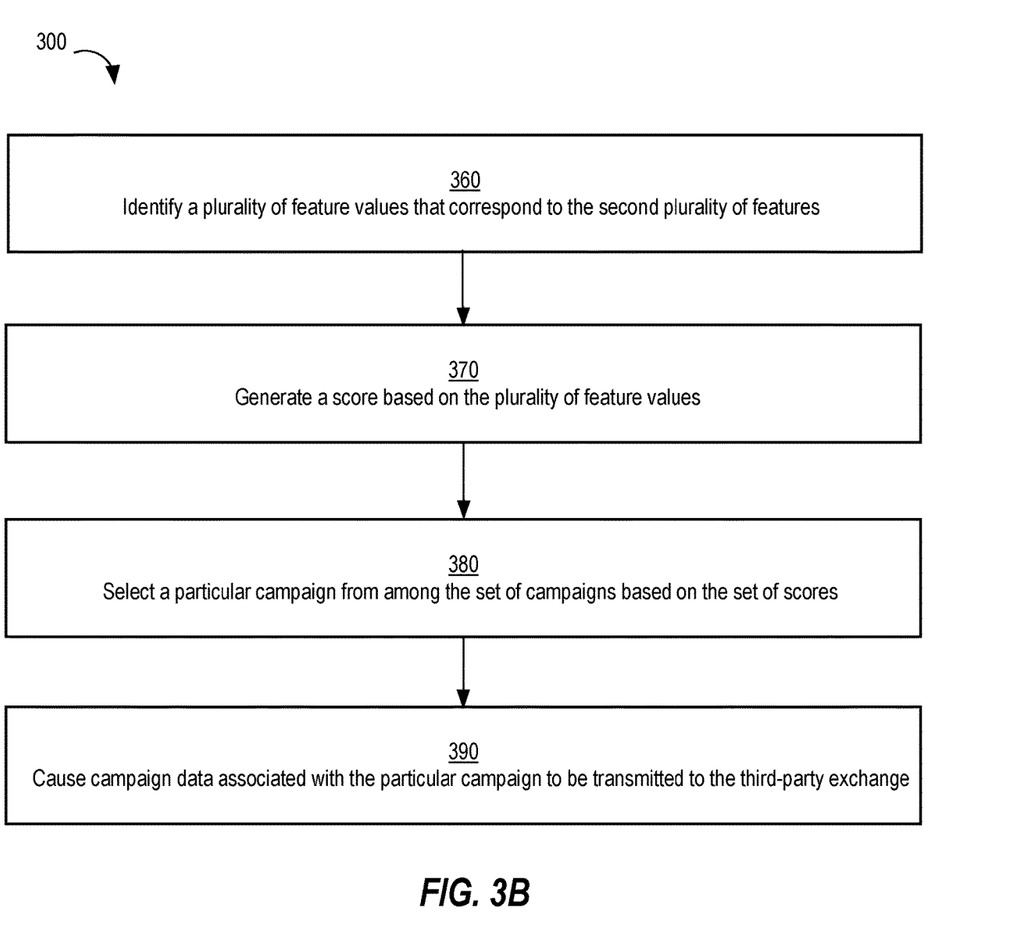

FIGS. 3A and 3B are flow diagrams that depict a process for predicting an offsite user interaction rate using a machine-learned model, in an embodiment. Process 300 may be implemented by content item serving service 240.

At block 310, a plurality of predicted entity interaction rates is generated using a first machine-learned model. An entity may be a member of an online service, such as a social network service. An example of a predicted entity interaction rate is a predicted CTR. The plurality of predicted entity interaction rates corresponds to respective entity-campaign pairs. An entity may be associated with one or more campaigns, and for each-campaign pair, a predicted entity interaction rate is calculated.

The first machine-learned model may be generated offline for an offsite prediction of entity interaction rates. The first machine-learned model includes a first plurality of features. The first machine-learned model can be an onsite model that is generated and trained using the first plurality of features (one or more onsite features such as attributes of an entity, attributes of a campaign or interaction between entities and campaigns).

At block 320, a second machine-learned model is trained using one or more machine learning techniques and the plurality of predicted entity interaction rates. The output of the first machine-learned model is used to train the second machine-learned model (offsite model). The second machine-learned model is based on a second plurality of features that includes a particular feature corresponding to predicted entity interaction rates generated by the first machine-learned model. The particular feature can be a predicted CTR generated by the onsite model based on the attributes of entities and attributes of campaigns.

The second machine-learned model also includes offsite measures. For example, the second plurality of features includes any cross-related offsite features to predict an accurate CTR of an offsite campaign. Non-limiting examples of the second plurality of features include historical data of the campaigns offsite, publisher systems, particular campaigns on publisher systems, third-party exchange systems, campaign format, and Operating Systems (OS). The historical data can include observed CTR or aggregates of clicks.

The second machine-learned model includes a plurality of weights that includes a particular weight corresponding to the particular feature. A weight value that corresponds to the particular weight is determined based on the training data using one or more machine-learning techniques and updated when the training data set is updated.

At block 330, content serving service 240 receives a content request from third-party exchange system 220. The content request is triggered by an initial content request from third-party publisher application 210 that is executed on client device 202 and that transmits the initial request over a computer network to third-party exchange system 220. The content request may be an HTTP request whose source address is that of the third-party exchange system and includes information about the content request, such as an identity of a publisher application, a member ID, or an IP address of client device 202.

At block 340, content serving service 240 identifies an entity identifier that is associated with the content request. Content serving service 240 determines whether the entity identifier is associated with a member ID stored in entity database 230. In other words, content serving service 240 determines whether a user who sent the content request is a member of an online service (such as a social networking service). Block 340 may involve identifying a MAID in the content request and determine whether the MAID is associated with member ID in entity database 230. If the entity identifier is determined to be a member of the online service, then a entity-campaign affinity score is determined.

At block 350, content serving service 240 identifies a set of campaigns that is associated with the identified entity identifier. Block 350 may involve calling campaign database 270 for one or more campaigns that are associated with the identified entity identifier. Campaign database 270 stores association data between members and campaigns, and interaction history of a member with respect to one or more campaigns such as whether a member has seen a particular campaign, whether the member has clicked on a content item of the particular campaign, or the member otherwise interacted with the particular campaign. If there is no campaign data that is associated with the entity identifier (no impression event for a particular entity-campaign pair), then a default value may be assigned. At block 360, for each campaign in the identified set of campaigns, a plurality of feature values that corresponds to the second plurality of features is identified. The plurality of feature values may include (1) one or more onsite feature values computed (e.g., before the content request is received) by onsite model component 242 and (2) offsite feature values computed (e.g., in real-time) by offsite model component 244, such as a particular predicted entity interaction rate (e.g., pCTR generated by the onsite model) or offsite features related to campaigns, OS, publisher systems, or campaign format. The feature values can be stored in feature database 280.

At block 370, using the second machine-learned model, a score is generated based on the plurality of features values. The score is generated based on the onsite-inferred data in combination with historical offsite data that encapsulates sophisticated features that can affect the predicted probabilities. The score is added to a set of scores. The set of scores can be stored as tuple values and stored in score database 290. In some embodiments, computation of the scores may be generated before receiving the content request.

At block 380, a particular campaign is selected from the set of campaigns based on the scores. A campaign with the highest score may be selected in response to the content request.

At block 390, in response to selecting the particular campaign, campaign data associated with the selected particular campaign is transmitted to third-party exchange system 220. Third-party exchange system 220 may transmit the campaign data to third-party publisher application 210 (or directly to client device 202) for display. As a result, the selected campaign is caused to be displayed on a screen of client device 202.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
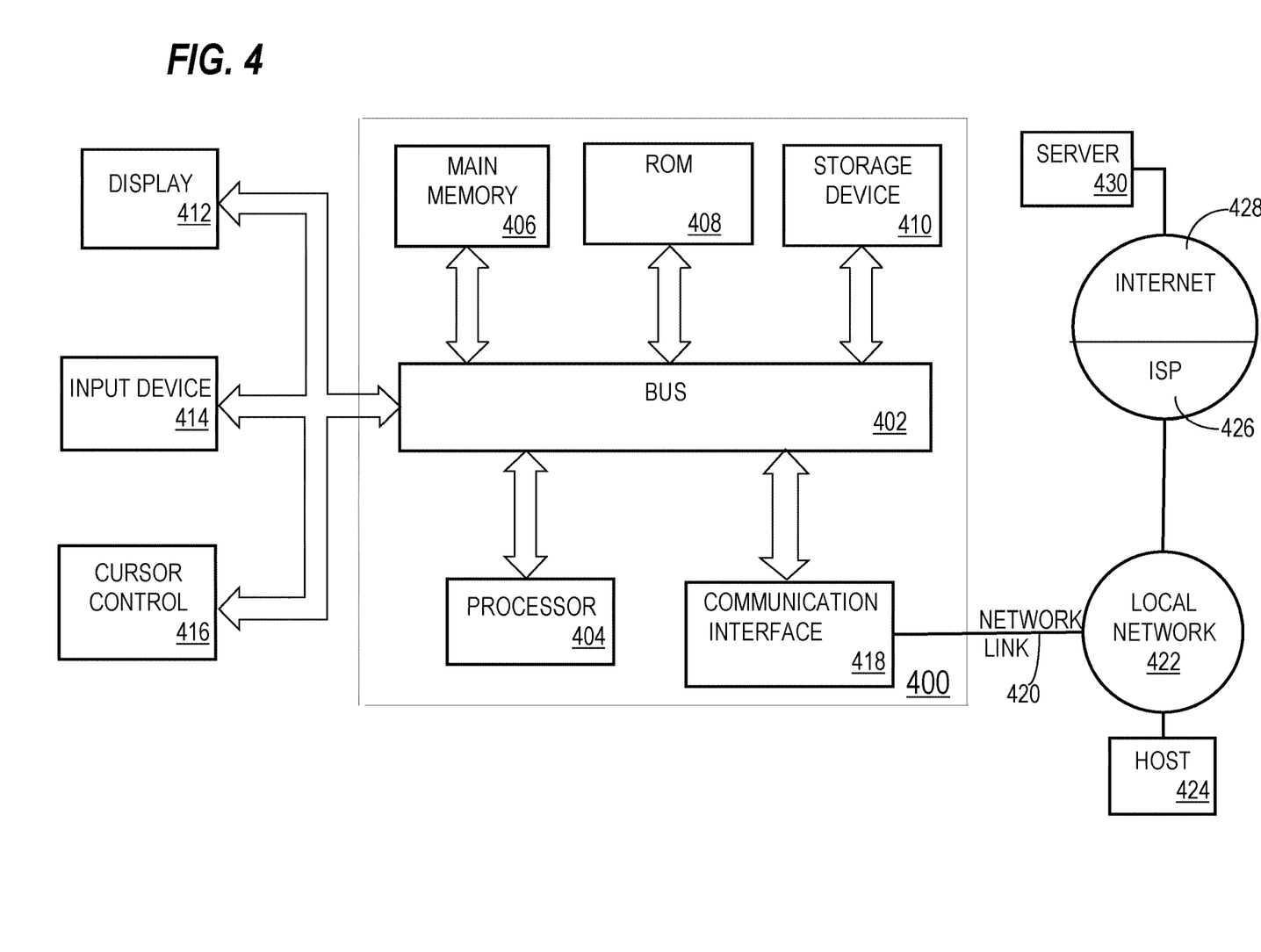
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

A cache is included as part of the main memory 406/ storage components. The cache may be implemented using any conventional, sufficiently fast technology, such as by using one or more flash memory devices, random access memory, a portion of main memory, etc. The cache may be implemented as a Solid-State Disk (SSD) or a as a module on the server. Cache memory is read and written to store the HTML content generated at URL inference service 140.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating, using a first machine-learned model, a first plurality of predicted entity interaction rates, each entity interaction rate corresponding to an entity-campaign pair, wherein the first machine-learned model comprises a first plurality of features that comprises attributes of an entity and attributes of a campaign;
   training, using one or more machine learning techniques and the first plurality of predicted entity interaction rates, a second machine-learned model that comprises (1) a second plurality of features that includes a particular feature corresponding to the first plurality of predicted entity interaction rates generated by the first machine-learned model and (2) a plurality of weights that includes a particular weight corresponding to the particular feature;
   generating, using the first machine-learned model, a second plurality of predicted entity interaction rates;
   after generating the second plurality of predicted entity interaction rates, receiving, over a computer network, from a third-party online exchange, a content request;
   in response to receiving the content request:
      identifying an entity identifier associated with the content request;
      based on the entity identifier, identifying a set of campaigns that is associated with the entity identifier;
      for each campaign in the set of campaigns:
         identifying a plurality of feature values that correspond to the second plurality of features and that include a predicted entity interaction rate, from the second plurality of predicated entity interaction rates, that corresponds to a pair comprising said each campaign and an entity identified by the entity identifier;
         generating, using the second machine-learned model, a score based on the plurality of feature values;
         adding the score to a set of scores;
      selecting a particular campaign from among the set of campaigns based on the set of scores;
      in response to selecting the particular campaign, causing campaign data associated with the particular campaign to be transmitted to the third-party online exchange;
   wherein the method is performed by one or more computing devices.

2. The method of claim 1, wherein the first plurality of features comprises an observed onsite entity interaction rate.

3. The method of claim 1, wherein the second plurality of features comprises at least one of observed entity interaction rates for one or more campaigns, observed entity interaction rates for one or more third-party exchanges, observed entity interaction rates for one or more third-party publisher systems, observed entity interaction rates for one or more Operating Systems (OS), observed entity interaction rates for one or more campaign formats, or observed entity interaction rates for a particular campaign rendered on a particular third-party publisher systems.

4. The method of claim 1, wherein generating the score is based at least in part on:
   identifying interaction activities associated with the identified entity identifier;

determining that the interaction activities occurred within a threshold number of days;

upon determining that the interaction activities occurred within the threshold number of days, generating the score for the identified entity identifier.

5. The method of claim 1, further comprising:

identifying a first set of entity identifiers that is associated with a first campaign;

determining that a number of the first set of entity identifiers is below a threshold number;

upon determining that the number of the first set of entity identifiers is below the threshold number, assigning a pre-defined score to the first set of entity identifiers that is associated with the first campaign.

6. The method of claim 1, further comprising:

identifying a second set of entity identifiers that is associated with a second campaign;

determining that a second set of scores for the second set of entity identifiers falls into a threshold range of score;

upon determining that the second set of scores for the second set of entity identifiers falls into the threshold range of score, disassociating the second campaign from the second set of entity identifiers;

adding a Gaussian random noise value to the second set of scores for the second set of entity identifiers.

7. The method of claim 1, wherein the score is generated using one or more discretization techniques.

8. The method of claim 1, wherein the score is generated using one or more histogram techniques.

9. One or more non-transitory storage media storing instructions which, when executed by one or more processors, perform a method comprising:

generating, using a first machine-learned model, a first plurality of predicted entity interaction rates, each entity interaction rate corresponding to an entity-campaign pair, wherein the first machine-learned model comprises a first plurality of features that comprises attributes of an entity and attributes of a campaign;

training, using one or more machine learning techniques and the first plurality of predicted entity interaction rates, a second machine-learned model that comprises (1) a second plurality of features that includes a particular feature corresponding to the first plurality of predicted entity interaction rates generated by the first machine-learned model and (2) a plurality of weights that includes a particular weight corresponding to the particular feature;

generating, using the first machine-learned model, a second plurality of predicted entity interaction rates;

after generating the second plurality of predicted entity interaction rates, receiving, over a computer network, from a third-party online exchange, a content request;

in response to receiving the content request:

identifying an entity identifier associated with the content request;

based on the entity identifier, identifying a set of campaigns that is associated with the entity identifier;

for each campaign in the set of campaigns:

identifying a plurality of feature values that correspond to the second plurality of features and that include a predicted entity interaction rate, from the second plurality of predicated entity interaction rates, that corresponds to a pair comprising said each campaign and an entity identified by the entity identifier;

generating, using the second machine-learned model, a score based on the plurality of feature values;

adding the score to a set of scores;

selecting a particular campaign from among the set of campaigns based on the set of scores;

in response to selecting the particular campaign, causing campaign data associated with the particular campaign to be transmitted to the third-party online exchange.

10. The one or more non-transitory storage media of claim 9, wherein the first plurality of features comprises an observed onsite entity interaction rate.

11. The one or more non-transitory storage media of claim 9, wherein the second plurality of features comprises at least one of observed entity interaction rates for one or more campaigns, observed entity interaction rates for one or more third-party exchanges, observed entity interaction rates for one or more third-party publisher systems, observed entity interaction rates for one or more Operating Systems (OS), observed entity interaction rates for one or more campaign formats, or observed entity interaction rates for a particular campaign rendered on a particular third-party publisher systems.

12. The one or more non-transitory storage media of claim 9, wherein generating the score is based at least in part on:

identifying interaction activities associated with the identified entity identifier;

determining that the interaction activities occurred within a threshold number of days;

upon determining that the interaction activities occurred within the threshold number of days, generating the score for the identified entity identifier.

13. The one or more non-transitory storage media of claim 9, when executed, the method further comprising:

identifying a first set of entity identifiers that is associated with a first campaign;

determining that a number of the first set of entity identifiers is below a threshold number;

upon determining that the number of the first set of entity identifiers is below the threshold number, assigning a pre-defined score to the first set of entity identifiers that is associated with the first campaign.

14. The one or more non-transitory storage media of claim 9, when executed, the method further comprising:

identifying a second set of entity identifiers that is associated with a second campaign;

determine that a second set of scores for the second set of entity identifiers falls into a threshold range of score;

upon determining that the second set of scores for the second set of entity identifiers falls into the threshold range of score, disassociating the second campaign from the second set of entity identifiers;

adding a Gaussian random noise value to the second set of scores for the second set of entity identifiers.

15. The one or more non-transitory storage media of claim 9, wherein the score is generated using one or more discretization techniques.

16. The one or more non-transitory storage media of claim 9, wherein the score is generated using one or more histogram techniques.

17. A system comprising:

a processor; and a memory storing instructions that, when executed by the processor, cause the processor to perform a method comprising:

generating, using a first machine-learned model, a first plurality of predicted entity interaction rates, each entity interaction rate corresponding to an entity-campaign pair, wherein the first machine-learned model comprises a first plurality of features that comprises attributes of an entity and attributes of a campaign;

training, using one or more machine learning techniques and the first plurality of predicted entity interaction rates, a second machine-learned model that comprises (1) a second plurality of features that includes a particular feature corresponding to the first plurality of predicted entity interaction rates generated by the first machine-learned model and (2) a plurality of weights that includes a particular weight corresponding to the particular feature;

generating, using the first machine-learned model, a second plurality of predicted entity interaction rates;

after generating the second plurality of predicted entity interaction rates, receiving, over a computer network, from a third-party online exchange, a content request;

in response to receiving the content request:
identifying an entity identifier associated with the content request;
based on the entity identifier, identifying a set of campaigns that is associated with the entity identifier;
for each campaign in the set of campaigns:
identifying a plurality of feature values that correspond to the second plurality of features and that include a predicted entity interaction rate, from the second plurality of predicated entity interaction rates, that corresponds to a pair comprising said each campaign and an entity identified by the entity identifier;
generating, using the second machine-learned model, a score based on the plurality of feature values;
adding the score to a set of scores;
selecting a particular campaign from among the set of campaigns based on the set of scores;
in response to selecting the particular campaign, causing campaign data associated with the particular campaign to be transmitted to the third-party online exchange.

18. The system of claim 17, wherein the first plurality of features comprises an observed onsite entity interaction rate.

19. The system of claim 17, wherein the second plurality of features comprises at least one of observed entity interaction rates for one or more campaigns, observed entity interaction rates for one or more third-party exchanges, observed entity interaction rates for one or more third-party publisher systems, observed entity interaction rates for one or more Operating Systems (OS), observed entity interaction rates for one or more campaign formats, or observed entity interaction rates for a particular campaign rendered on a particular third-party publisher systems.

20. The system of claim 17, wherein generating the score is based at least in part on:
identifying interaction activities associated with the identified entity identifier;
determining that the interaction activities occurred within a threshold number of days;
upon determining that the interaction activities occurred within the threshold number of days, generating the score for the identified entity identifier.

* * * * *

UNITED STATES PATENT AND TRADEMARK OFFICE
CERTIFICATE OF CORRECTION

PATENT NO. : 11,004,108 B2  
APPLICATION NO. : 16/457511  
DATED : May 11, 2021  
INVENTOR(S) : Alagu Sanjana Haribhaskaran et al.

Page 1 of 1

It is certified that error appears in the above-identified patent and that said Letters Patent is hereby corrected as shown below:

On the Title Page (72) Inventors:  
Alagu Sanjana Haribhaskaran - Please delete "Redmond, WA" and insert --San Francisco, CA--.  
Shahriar Shariat Talkhoonche - Please delete "Redmond, WA" and insert --Orinda, CA--.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*